(12) United States Patent
Takeuchi et al.

(10) Patent No.: US 7,346,593 B2
(45) Date of Patent: Mar. 18, 2008

(54) AUTOREGRESSIVE MODEL LEARNING DEVICE FOR TIME-SERIES DATA AND A DEVICE TO DETECT OUTLIER AND CHANGE POINT USING THE SAME

(75) Inventors: Junichi Takeuchi, Tokyo (JP); Kenji Yamanishi, Tokyo (JP)

(73) Assignee: NEC Corporation, Tokyo (JP)

( * ) Notice: Subject to any disclaimer, the term of this patent is extended or adjusted under 35 U.S.C. 154(b) by 273 days.

(21) Appl. No.: 10/619,626

(22) Filed: Jul. 16, 2003

(65) Prior Publication Data
US 2004/0015458 A1   Jan. 22, 2004

(30) Foreign Application Priority Data
Jul. 17, 2002   (JP)   ............................. 2002-207718

(51) Int. Cl.
*G06F 17/00*   (2006.01)
(52) U.S. Cl. ............................. 706/12; 706/12; 706/14; 706/16; 706/45; 706/50; 708/3; 708/100; 708/131; 708/160; 708/446; 708/800
(58) Field of Classification Search .................... 706/1, 706/12, 14, 16, 45, 50, 935; 702/79, 176, 702/181; 708/100, 3, 8, 131, 160, 446, 800; 703/2
See application file for complete search history.

(56) References Cited

U.S. PATENT DOCUMENTS 5,257,364 A * 10/1993 Melamed et al. ............. 703/21
6,055,491 A *  4/2000 Biliris et al. ................. 702/176
6,697,769 B1 *  2/2004 Goodman et al. ............. 703/2

FOREIGN PATENT DOCUMENTS

GB         2361336      10/2001
JP       2001-101154    4/2001

OTHER PUBLICATIONS

Shaw et al. "Automated Error Detection in Multibeam Bathymetry Data", IEEE ublication, 1993.*
Burge et al "Detecting Cellular Fraud Using Adaptive Prototypes".*

(Continued)

*Primary Examiner*—David Vincent
*Assistant Examiner*—Omar F Fernández Rivas
(74) *Attorney, Agent, or Firm*—Foley & Lardner LLP

(57) ABSTRACT

For sequentially input data string, the outliner and the change point are detected through calculation of the outlier score and the change point score by combining a time-series model learning device to learn the generation mechanism of the read data series as the time-series statistic model, a score calculator to calculate the outlier score of each data based on the time-series model parameter and the input data, a moving average calculator to calculate the moving average of the outlier score, a time-series model learning device to learn the generation mechanism of the moving average series as the time-series statistic model and the above score calculator that further calculates the outlier score of the moving average based on the moving average of the outlier score and outputs the result as the change point score of the original data.

17 Claims, 10 Drawing Sheets

OTHER PUBLICATIONS www.trade10.com, "moving average".*

Li et al., "GPS Time Series Modeling by Autoregressive Moving Average Method: Application to the Crustal Deformation in Central Japan", The Society of Geomagnetism and Earth, Planetary and Space Sciences, 2000, pp. 155-162.*

Li et al. "GPS Time Series Modelling by Autoregressive Moving Average Method Application to the Crustal Deformation in Central Japan", The Society of Geomagnetism and Earth, Planetary and Space Sciences, 2000, pp. 155-161.*

Li et al. "GPS Time Series Modeling by Autoregressive Moving Average Method: Application to the Crustal Deformation in Central Japan", 2000, pp. 155-162.*

P. Burge, et al., "Detecting Cellular Fraud Using Adaptive Prototypes.", (Proceedings of AI Approaches to Fraud Detection and Risk Management), pp. 9-13, 1997.

K. Yamanishi, et al., "On-line Unsupervised Outlier Detection Using Finite Mixtures with Discounting Learning Algorithms", (Proceedings of the sixth ACM SIGKDD International Conference onKnwoledge Discovery and Data Mining, ACM Press), pp. 320-324, 2000.

U. Murad, et al., "Unsupervised Profiling for Identifying Superimposed Fraud", (Proceedings of 3$^{rd}$ European conference on Principles and Practice of Knowledge Discovery in Database), pp. 251-261, 1999.

B. Guthery, "Partition Regression", in Journal of American Statistical Association, vol. 69, pp. 945-947, 1974.

M. Huskova, "Nonparametric Procedures for Detecting a Change in Simple Linear Regression Models", *Applied Change Point Problems in Statistics*, Nova Science Publishers, Inc., 1995.

V. Guralnik, et al., "Event Detection from Time Series Data", (Proceedings of the ACM SIGKDD International Conference on Knowledge Discovery and Data Mining, ACM Press), pp. 32-42, 1999.

Vasundhara Puttagunta, et al., Adaptive Methods for Activity Monitoring of Streaming Data, Proceedings of the 2002 International Conferences on Machine Learning and Applications (ICMLA '02), U.S.A., CSREA Press, Jun. 24, 2002, pp. 197-203, [Searched Feb. 2, 2006], Internet <URL, http://www.csee.umbc.edu/~kalpakis/homepage/papers/kalpakisICMLA02.pdf>.

Kenji Yamanishi et al., "Data Mining with Statistic Outlier Detection and Application to Network Invasion Detection," Technical Research Reports of the Institute of Electronics, Information and Communication Engineers, Japan, the Institute of Electronics, Information and Communication Engineers, Jun. 14, 2002, vol. 102, No. 132, pp. 19-24.

Ikuo Yonemoto et al., "On-line Estimation of Probability Density Function Using Information Quantity Standard," Technical Research Reports of the Institute of Electronics, Information and Communication Engineers, Japan, the Institute of Electronics, Information and Communication Engineers, Dec. 18, 1998, vol. 98, No. 490, pp. 189-194.

* cited by examiner

AUTOREGRESSIVE MODEL LEARNING DEVICE FOR TIME-SERIES DATA AND A DEVICE TO DETECT OUTLIER AND CHANGE POINT USING THE SAME

BACKGROUNDS OF THE INVENTION

1. Field of the Invention

The present invention relates to an autoregressive model learning device for time-series data and a device to detect outlier and change point using the same and particularly relates to a detection device associated with data analysis and data mining technologies that calculates the outlier score and the change point score for the data described with the discrete variate and/or continuous variate sequentially input, so as to detect the outlier and the change point with a high accuracy.

2. Description of the Related Art

Conventionally, this type of detection device that calculates the outlier score and the change point score of the time-series data for detection of the outlier and the change point uses the technologies treated in the fields of statistics, machine learning, data mining and others. In other words, abnormal value detection and change point detection, which are the functions to be realized by the present invention, have been conventionally addressed by the fields of statistics, machine learning, data mining and so on.

The present invention, however, is applied to the situation where the stationarity is not assumed for the data generation source or the information source.

Literature on the outlier detection in such a case includes the materials as shown below:

One example is a method by P. Burge and J. Shawe-Taylor called "Detecting cellular fraud using adaptive prototypes" (Proceedings of AI Approaches to Fraud Detection and Risk Management, pp: 9-13, 1997).

Another example is a method by K. Yamanishi titles "On-line Unsupervised Outlier Detection Using Finite Mixtures with Discounting Learning Algorithms (Proc. of the Sixth ACM SIGKDD International Conference on Knowledge Discovery and Data Mining, ACM Press, pp: 320-324, 2000).

Still another example is a method by U. Murad and G. Pinkas called "Unsupervised profiling for identifying superimposed fraud" (Proceedings of 3rd European Conference on Principles and Practice of Knowledge Discovery in Databases, pp: 251-261, 1999).

These materials use the adaptive outlier detection algorithm to handle the non-stationarity.

Further, according to a known ordinary method to detect the change point in statistics, the number of change points in the given data is decided in advance and a model is applied considering that the data among change points can be described by a stationary model. Such a method is described, for example, in the following literature.

An example is a paper by B. Guthery titled "Partition regression" in Journal of American Statistical Association] (69:945-947, 1974) or a paper by M. Huskova "Nonparametric procedures for detecting a change in simple linear regression models" in the book titled "Applied Change Point Problems in Statistics" (Nova Science Publishers, Inc, 1995).

For detection of the change point in data mining, a method by V. Guralnik and J. Srivastava is described in "Event detection from time series data" (Proc. of the ACM SIGKDD International Conference on Knowledge Discovery and Data Mining, ACM Press, pp: 32-42, 1999).

The conventional methods and devices according to the above literature have drawbacks as follows as a device to detect outliers and change points from the time-series data.

In the outlier detection method that can be sequentially processed by the conventional machine learning technology such as the method by P. Burge and J. Shawe-Taylor, the method by K. Yamanishi et al., or the method by U. Murad and G. Pinkas as described above, any statistic model suitable for time-series data is not used. Therefore, there is a drawback that the characteristics of the data having time-series nature cannot be grasped sufficiently. The statistic model suitable for time-series data here means a model that can express correlation among data at different timings. For example, the autoregressive model and Markov model are such type of models.

In addition, the conventional change point detection method described in the paper by V. Guralnik and J. Srivastava basically uses collective processing of data or so-called batch processing and cannot process the data sequentially. Further, the conventional change point detection methods as described above are designed on the assumption that the data are locally stationary, but such assumption is not appropriate in the reality and should be removed.

Further, though it is preferable to handle the outliers and the change points together and detect each of them in application of data mining or the like, schemes to handle them together only has been known so far.

SUMMARY OF THE INVENTION

An object of the present invention is to solve the above problems. More specifically, it is an object of the present invention to use a statistic model that can grasp the nature of the time-series data, to support non-stationary data, to handle the outliers and the change points together and to sequentially execute the processing.

According to the first aspect of the invention, an autoregressive model learning device that sequentially reads the data string of the real number vector values and learns the probability distribution for generation of the data string using the autoregressive model comprises a data updating device that updates the sufficient statistic of the autoregressive model with forgetting the past data using newly read data and a parameter calculator that reads the sufficient statistic updated by the data updating device and calculates the parameter of the autoregressive model using the sufficient statistic.

According to the second aspect of the invention, an outlier and change point detection device that calculates the outlier score and the change point score for the data described with the sequentially input discrete variate and/or continuous variate so as to detect the outlier and the change point comprises a first model learning device that learns the generation mechanism for the read data series as the time-series statistic model specified by the finite number of parameters, and an outlier score calculator that reads the value of the parameters obtained through learning by the first model learning device, calculates the outlier score of the data based on the read parameter of the time-series model and the input data and outputs the results.

In the preferred construction, the outlier and change point detection device further comprises as a detection device to detect the change point, a moving average calculator that sequentially reads the outlier scores calculated by the outlier score calculator and calculates their moving average, a second model learning device that sequentially reads the moving average of the outlier scores calculated by the moving average calculator and learns the generation mechanism for the moving average series in the read score as a time-series statistic model specified by the finite number of parameters, and a change point score calculator that reads the parameter value obtained by learning by the second model learning device and calculates the outlier score for each moving average based on the read parameter of the time-series model and the moving average of the input outlier scores and outputs the outlier score for each moving average as the change point score of the original data.

In another preferred construction, the first model learning device learns, in case the sequentially input data are described with continuous variate only, the probability distribution for generation of the data string with sequentially reading the data strings of the real number vector values using the autoregressive model and further comprises a data updating device to update the sufficient statistic of the autoregressive model with forgetting the past data using the newly read data and a parameter calculator to read the sufficient statistic updated by the data updating device and to calculate the parameter of the autoregressive model using the sufficient statistic.

In another preferred construction, the outlier score calculator and the change point score calculator are considered as a single score calculator, further comprising as a device to determine the candidates of outliers and change points in the series for the data series described in discrete and/or continuous variates, a sort device to sort the data in descending order based on the outlier score and the change point score calculated by the score calculator and the display device that displays the data with higher scores according to the order sorted by the sort device as the candidates of outliers and change points.

In another preferred construction, the outlier score calculator and the change point score calculator are considered as a single score calculator, further comprising, as a device to determine candidates of outliers and change points in the series for the data described in discrete and/or continuous variates sequentially input, a score judgement device that outputs the data over the predetermined threshold from the outlier score and the change point score calculated by the score calculator as the candidates of outliers or change points.

According to the third aspect of the invention, an autoregressive model learning method in which the data string of the real number vector values are sequentially read and the probability distribution for generation of the data string is learned using the autoregressive model, comprising the steps of a data updating step of updating the sufficient statistic of the autoregressive model with forgetting the past data using newly read data, and a parameter calculation step of reading the sufficient statistic updated by the data updating step and calculating the parameter of the autoregressive model using the sufficient statistic.

According to another aspect of the invention, an outlier and change point detection method to detect the outlier and change point by calculating the outlier score and the change point score for the data described with the sequentially input discrete variate and/or continuous variate, comprising the steps of a learning step of learning the mechanism to generate the read data series as a time-series statistic model specified by the finite number of parameters, and an outlier score calculation step of reading the parameter value obtained through learning by the learning step and calculating the outlier score of each data based on the read parameter of the time-series model and the input data and outputting the results.

In the preferred construction, the method to detect the change point further comprises a moving average calculation step of sequentially reading the outlier score calculated by the outlier score calculation step and calculating the moving average, a second learning step of sequentially reading the moving average of the outlier score calculated by the moving average calculation step and learning the generation mechanism for the moving average series in the read score as a time-series statistic model specified by the finite number of parameters, and a change point score calculation step of reading the parameter values obtained through learning by the second learning step, calculating the outlier score of each moving average based on the read parameter of the time-series model and the moving average of the input outlier scores and outputting the outlier score as the change point score of the original data.

In another preferred construction, in case the sequentially input data are described with continuous variate only, the learning step sequentially reads the data string of the real number vector values and learns the probability distribution for generation of the data string using the autoregressive model, and updates the sufficient statistic of the autoregressive model with forgetting the past data using newly read data, reads the updated sufficient statistic and calculates the parameter of the autoregressive model using the sufficient statistic.

In another preferred construction, the outlier score calculation step and the change point score calculation step are considered as a single score calculation step and further comprises a step in which, as a method to determine candidates of outliers and change points in the series for the data series described with discrete and/or continuous variates, the data are sorted in descending order based on the calculated outlier score and the change point score and the higher score data are displayed as the outlier and change point candidates according to the order of sorting.

In another preferred construction, the outlier score calculation step and the change point score calculation step are considered as a single score calculation step and further comprising a step in which, as a method to determine outlier and change point candidates in the series, the data over the predetermined threshold selected from the calculated outlier and change point scores as the candidates of outliers or change points for the data described with discrete variate sequentially input and/or continuous variate.

Thus, according to the present invention, the data are updated at the same time as forgetting of the past data. The present invention is suitable to process the time-series data and can improve the processing accuracy.

Other objects, features and advantages of the present invention will become clear from the detailed description given herebelow.

BRIEF DESCRIPTION OF THE DRAWINGS the present invention will be understood more fully from the detailed description given herebelow and from the accompanying drawings of the preferred embodiment of the invention, which, however, should not be taken to be limitative to the invention, but are for explanation and understanding only.

DESCRIPTION OF THE PREFERRED EMBODIMENT

Figure 1:
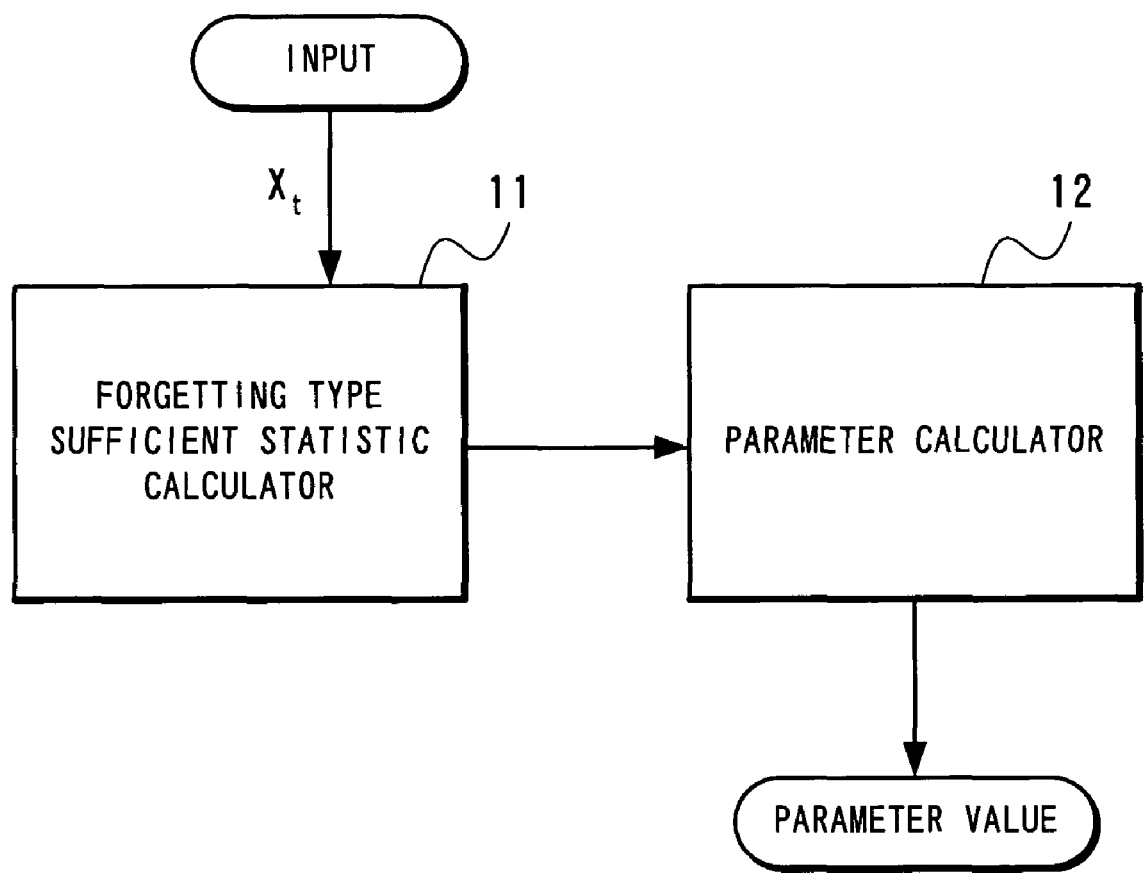
FIG. 1 is a configuration diagram to show the configuration of a first embodiment of an AR model learning device according to the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to not unnecessarily obscure the present invention.

Referring to the attached figures, preferred embodiments of the present invention are described below.

First of all, the notation is explained. "x" represents the data of n-dimensional vector value having a real number as the component. "y" represents the data of m-dimensional vector value having a discrete value as the component. "x" and "y" are collectively expressed as "z=(x, y)". A series comprising N pieces of data is expressed as "$Z^N=Z_1, Z_2, \ldots Z_N$".

A method to calculate the "outlier score" for such a series is described below.

Firstly, consider a statistic model to generate the data z: $P(Z_i|\theta)=p(x_i, y_i|\theta)$. This represents the range where "z" moves or the probability density function defined on the range Z.

"$\theta$" is a parameter to specify the probability density and generally consists of a discrete parameter and a continuous value parameter. As the probability density function of this type, the finite mixed Gaussian distribution or the autoregressive model (time-series model) are used if "z" comprises continuous variables, for example. In case of the time-series model, the probability density of the i-th data $Z_i$ depends on the series $Z^{i-1}$ so far and the model becomes as follows: $p(z_i|z^{i-1}, \theta)$ In general, for calculation of the outlier score, the value of the parameter $\theta$ is assumed (or "learned") based on the data series. Here, the parameter is learned using the "Sequential learning method", in which the data series is sequentially read and at the same time the parameter is sequentially changed based on the read data. Suppose here that the parameter value obtained as a result of learning with reading the data to $z_i$ to be "$\theta^{(i)}$". The outlier score for "$Z_{i+1}$" can be calculated using this. For example, the logarithm score $S_L$ and Hellinger score sH can be calculated by the formulas 1 and 2 below.

$$s_L = -\log p(z_{i+1}|\theta^{(i)}) \qquad \text{(formula 1)}$$

$$s_H = d^2(p(\cdot|z^i, \theta^{(i)}), p(\cdot|z^{i-1}, \theta^{(i-1)})) \qquad \text{(formula 2)}$$

where "$d^2$" is the squared Hellinger distance between two probability densities and is defined by Formula 3 below.

$$d^2(p, q) = \sum_X \int \left(\sqrt{p(x, y)} - \sqrt{q(x, y)}\right)^2 dy \qquad \text{(formula 3)}$$

Next, the AR model used in the present invention is described. The AR model is a time-series statistic model to describe the probability distribution of the series of the n-dimensional real number vector data $x_i$. Firstly, the series "$\omega^N = \omega_1 \omega_2 \ldots \omega_N$" is introduced as an auxiliary probability variable. This is supposed to be in the same dimension as "x" (n-dimension). Generally, the k-degree AR model can be expressed by Formula 4 below.

$$w_t = \Sigma A_i w_{t-i} + \epsilon \qquad \text{(formula 4)}$$

Note that $A_i$ (i=1, ..., k) is an n-dimensional square matrix and $\epsilon$ is a probability variable according to normal distribution of covariance matrix $\Sigma$ with an average of "0".

Suppose now that $x_t$ can be given using $u_t$ as "$x_t = u_t + \mu$". If Formula 5 below is given here, the probability density function of $x_t$ can be given by Formula 6 below.

$$x_{t-k}^{t-1} = (x_{t-1} \cdots x_{t-k}) \qquad \text{(formula 5)}$$

$$p(x_t | x_{t-k}^{t-1} : \theta) = \qquad \text{(formula 6)}$$

$$\frac{1}{(2\pi)^{\frac{k}{2}}|\Sigma|^{\frac{1}{2}}} \exp\left(-\frac{(x_t - \xi)^T}{2} \Sigma^{-1} (x_t - \xi)\right) \text{ however,}$$

$$\xi = \sum_{i=1}^{k} A_i w_{t-1} + \mu, \theta = \left(A_1, \cdots, A_k, \mu, \Sigma\right)$$

An outlier level calculator sequentially reads the data series from the beginning and, when it reads the i-th data $z_i$, outputs its outlier level $s_{(i)}$.

Then, referring to FIG. 1, an autoregressive model learning device as described above is explained as a first embodiment. Suppose here that the constant r to express the speed of forgetting and the degree k of the AR model are given in advance. The constant r is a value from 0 to 1. Smaller constant means quicker forgetting of the past data.

As shown in the figure, the first embodiment is a data updating device and comprises a forgetting type sufficient statistic calculator 11 to receive input $x_t$ and a parameter calculator 12 to receive the output of the same and to send the parameter value.

The forgetting type sufficient statistic calculator 11 is a device to calculate the forgetting type sufficient statistic in the AR model. The forgetting type sufficient statistic is the sufficient statistic corrected so that the influence of older data becomes smaller. The sufficient statistic here means the n-dimensional vector $\mu$ and "k+1" pieces of n-dimensional square matrix $C_j$ (j=0, 1, . . . , k). The forgetting type sufficient statistic calculator 11 has a function to store the past data at the timing k for the k-degree AR model.

The parameter calculator 12 calculates the value for parameter $\theta"=(\Lambda_1, \ldots, \Lambda_k, \mu, \Sigma)"$ of the AR model based on the given sufficient statistic.

Figure 2:
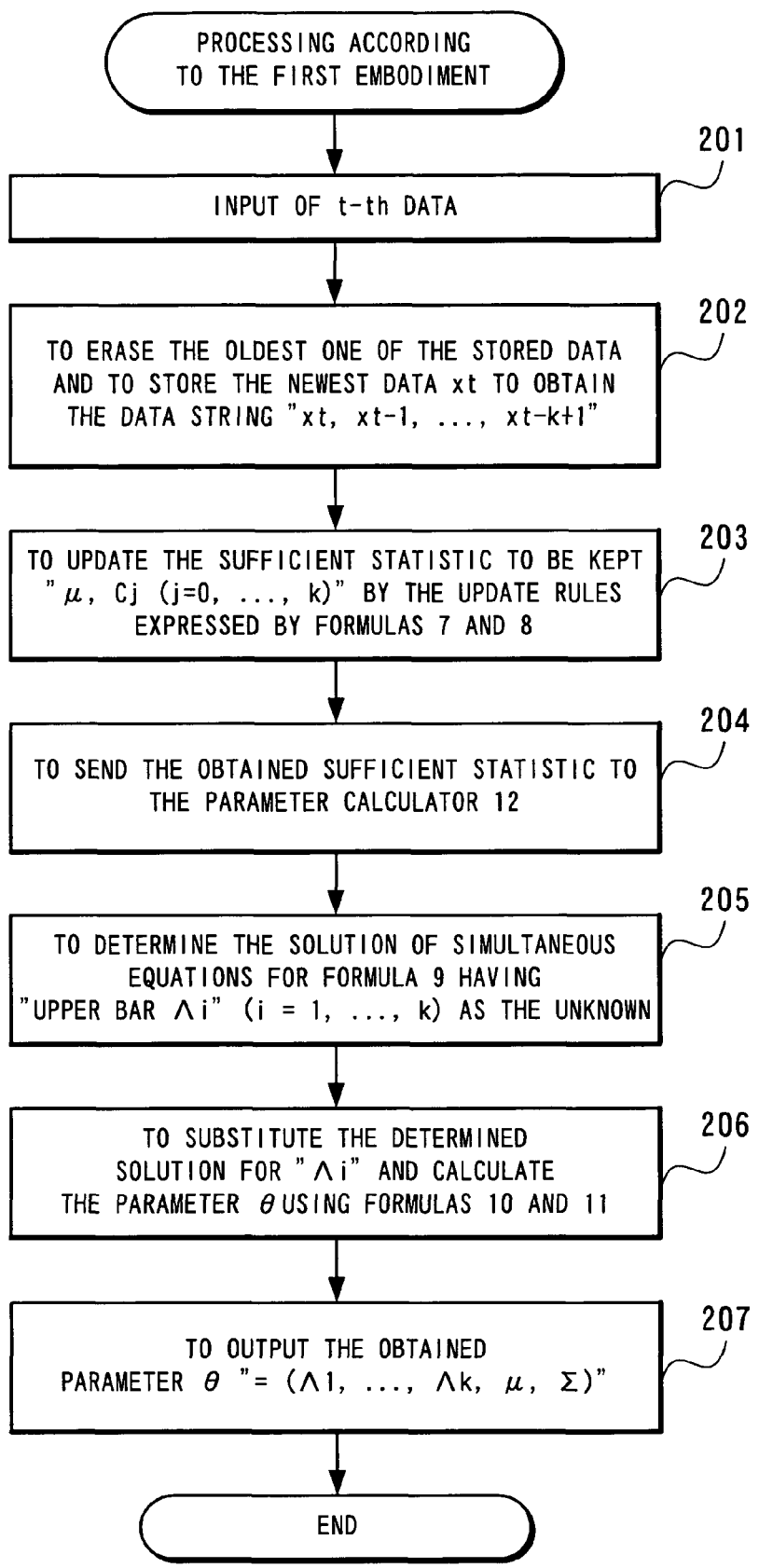
FIG. 2 is a flowchart to illustrate the operation of the first embodiment.

Referring to the flowchart of FIG. 2, the operation in the first embodiment is described. Firstly, the parameters stored in the parameter calculator 12 are initialized before data reading. Then, every time the t-th data is input, the following steps are executed.

The forgetting type sufficient statistic calculator 11 deletes the oldest data it has stored when data $x_t$ is input (Step 201) and stores the newest data $x_t$ instead to obtain the data string "$x_t, x_{t-1}, \ldots, x_{t-k+1}$"" (Step 202).

Using this, the forgetting type sufficient statistic calculator 11 updates the sufficient statistic "$\mu, C_j$ (j=0, . . . , k)" it keeps by the update rules expressed by Formulas 7 and 8 shown below (Step 203) and sends the obtained sufficient statistic to the parameter calculator 12 (Step 204).

$$\mu:=(1-r)\mu+rx_t \quad \text{(formula 7)}$$

$$C_j:=(1-r)C_j+r(x_t-\mu)(x_{t-j}-\mu)^T \quad \text{(formula 8)}$$

The parameter calculator 12 determines the solution of the simultaneous equations for Formula 9 below having "upper bar $\Lambda_i$" (i=1, . . . , k) as the unknown (Step 205). Note that "$C_{-j}=C_j$".

$$C_j = \sum_{i=1}^{k} \overline{\Lambda}_i C_{j-1} (j=1, \cdots, k) \quad \text{(formula 9)}$$

$$\text{however } \overline{\Lambda}_j (i=1, \cdots, k)$$

The parameter calculator 12 substitutes the determined solution for "$\Lambda_i$" and calculates the parameter $\theta$ using Formulas 10 and 11 below (Step 206).

Then, it outputs the obtained parameter $\theta"=(\Lambda_1, \ldots, \Lambda_k, \mu, \Sigma)"$ (Step 207).

$$x_{it} := \sum_{i=1}^{k} \Lambda_i (x_{t-1} - \mu) + \mu \quad \text{(formula 10)}$$

$$\Sigma:=(1-r)\Sigma+r(x_t-z_{it})(x_t-z_{it})^T \quad \text{(formula 11)}$$

Figure 3:
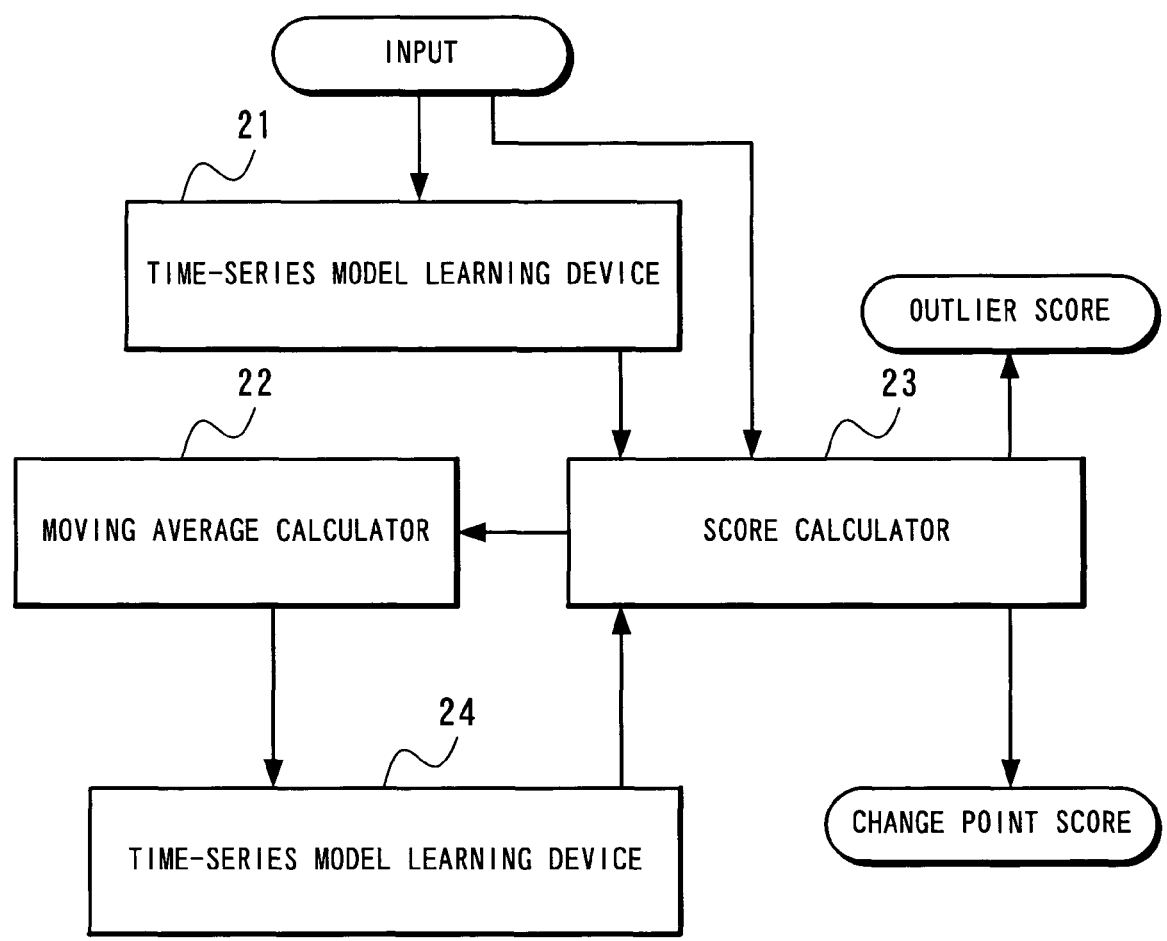
FIG. 3 is a configuration diagram to show the configuration of second and third embodiments of a device to calculate the outlier score and the change point score according to the present invention.

Then, referring to FIG. 3, second and third embodiments are described below.

As shown in the figure, these embodiments comprise a time series model learning devices 21 and 24 corresponding to the first and second model learning devices as described above, a moving average calculator 22 and a score calculator 23 containing both of the outlier score calculator and the change point score calculator described above. The second embodiment is realized by the time-series model learning device 21 and an outlier score calculator and the third embodiment is realized by the time-series model learning devices 21 and 24 and the score calculator 23.

The time-series model learning devices 21 and 24 are devices to learn the parameter in the probability density function of the time series model with sequentially reading data.

Note that, on one hand, the time-series model learning device 21 is a device to learn the probability density function related to the input data $z_t$ and the probability density function $F_p$ used here is expressed by Formula 12 below.

$$F_p = p(z_t|z^{t-1}, \xi) \quad \text{(formula 12)}$$

On the other hand, the other time-series model learning device 24 is a device to learn the probability density function related to the moving average series of the score calculated by the moving average calculator 23 and uses a k-degree AR model with a single variate. The probability density function $F_{qk}$ is expressed by Formula 13 below.

$$F_{qk} = q(\alpha_t | \alpha_{t-k}^{t-1}, \theta) \quad \text{(formula 13)}$$

The score calculator 23 reads the parameters and data of the probability density functions $F_p$ and $F_{qk}$ and calculates the score for data $x_t$. The score calculator 23 has, in addition to its calculation function, a function to save the latest u(z) pieces of data for "$Z_t$" series, the latest u($\alpha$) pieces of data for "$\alpha_t$" series and the previous parameter for "$\theta$" and "$\xi$". In case of the probability density function $F_{qk}$ using the k-degree AR model, for example, the logarithm score or the Hellinger score can be calculated under the condition "u($\alpha$)=k".

The moving average calculator 22 is a device that calculates and outputs the T moving average of the real number data input sequentially. For this purpose, the moving average calculator 22 has a function to store T pieces of real numbers inside.

Figure 4:
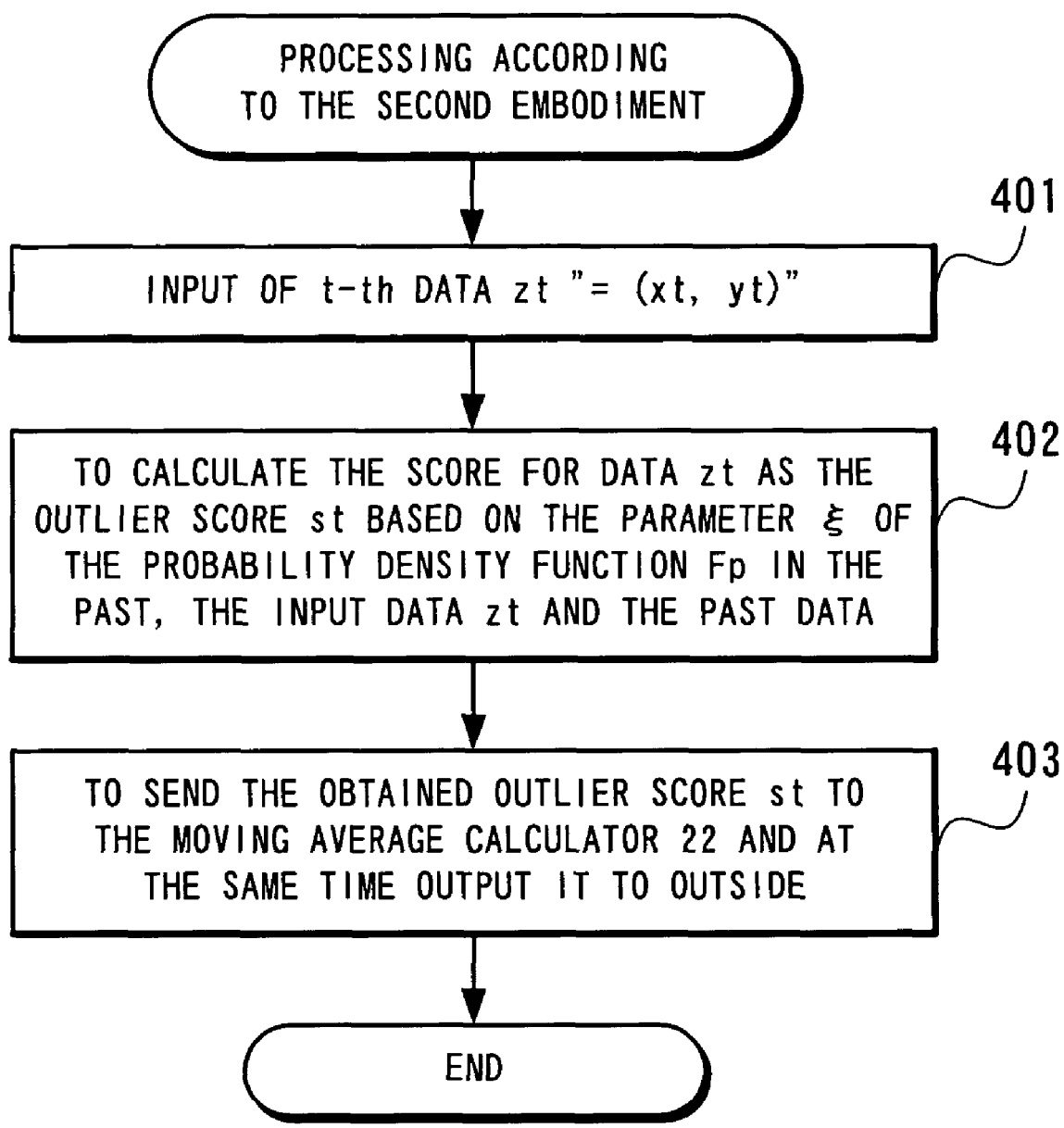
FIG. 4 is a flowchart to illustrate the operation of the second embodiment.

The device related to the second embodiment works according to the order below. Referring to the flowchart of FIG. 4, the operation of the second embodiment is described below.

The entire system is initialized first. Some predetermined values are set to the devices to store the parameters and data. The device shown in the figure works as follows every time the t-th data $z_t"=(x_t, y_t)"$ is input.

The time-series model learning device 21 and the score calculator 23 receive the input of data $z_t$ (Step 401).

The score calculator 23 calculates the score for data $z_t$ as the outlier score $s_t$ based on the parameter $\xi$ of the probability density function $F_p$ input and saved in the past, the input data $z_t$ and the past data "$z_{t-1}, z_{t-2}, \ldots, z_{t-u}$" (Step 402).

Then, the obtained outlier score $s_t$ is sent to the moving average calculator 22 and at the same time output to outside (Step 403).

Figure 5:
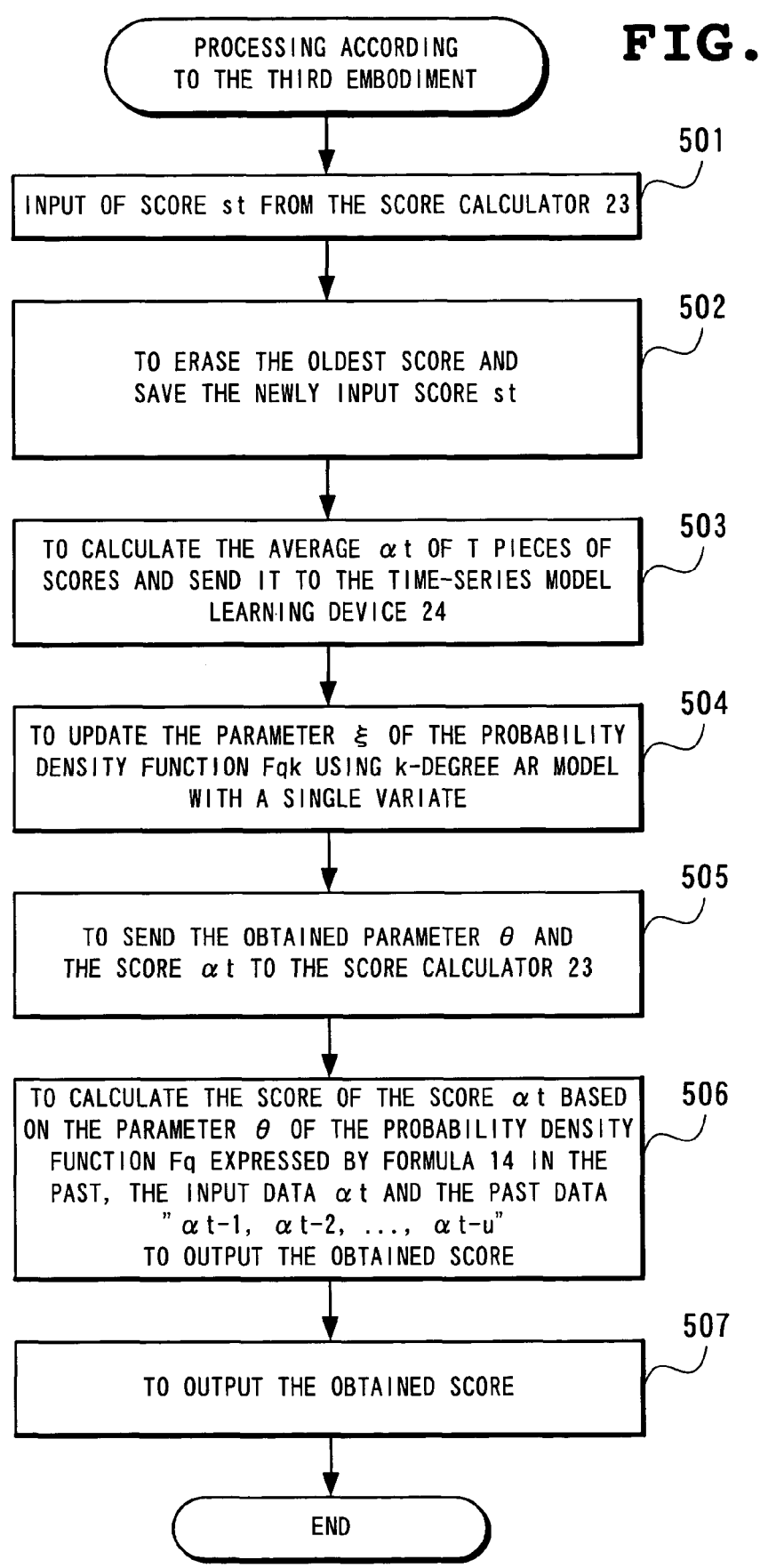
FIG. 5 is a flowchart to illustrate the operation of the third embodiment.

The device related to the third embodiment works according to the order below following the second embodiment above. The operation of the third embodiment is described below with referring to the flowchart of FIG. 5.

When the moving average calculator 22 receives the score $s_t$ from the score calculator 23 (Step 501), it erases the oldest saved score and saves the newly input score $s_t$ (Step 502).

Then, the moving average calculator 22 calculates the average $\alpha_t$ of T pieces of saved scores and sends it to the time-series model learning device 24 (Step 503).

The time-series model learning device 24 works as explained in the first embodiment above and updates the parameter $\xi$ of the probability density function $F_{qk}$ using k-degree AR model with a single variate (Step 504) and sends the obtained parameter θ and the score $\alpha_t$ to the score calculator 23 (Step 505).

The score calculator 23 calculates the score of the score $\alpha_t$ or the change point score based on the parameter θ of the probability density function $F_q$ expressed by Formula 14 below input in the past and saved, the input data $\alpha_t$ and the past data "$\alpha_{t-1}, \alpha_{t-2}, \ldots, \alpha_{t-u}$" (Step 506) and outputs the obtained score (Step 507).

$$F_q = q(\alpha_t | \alpha^{t-1}, \theta) \qquad \text{(formula 14)}$$

Figure 6:
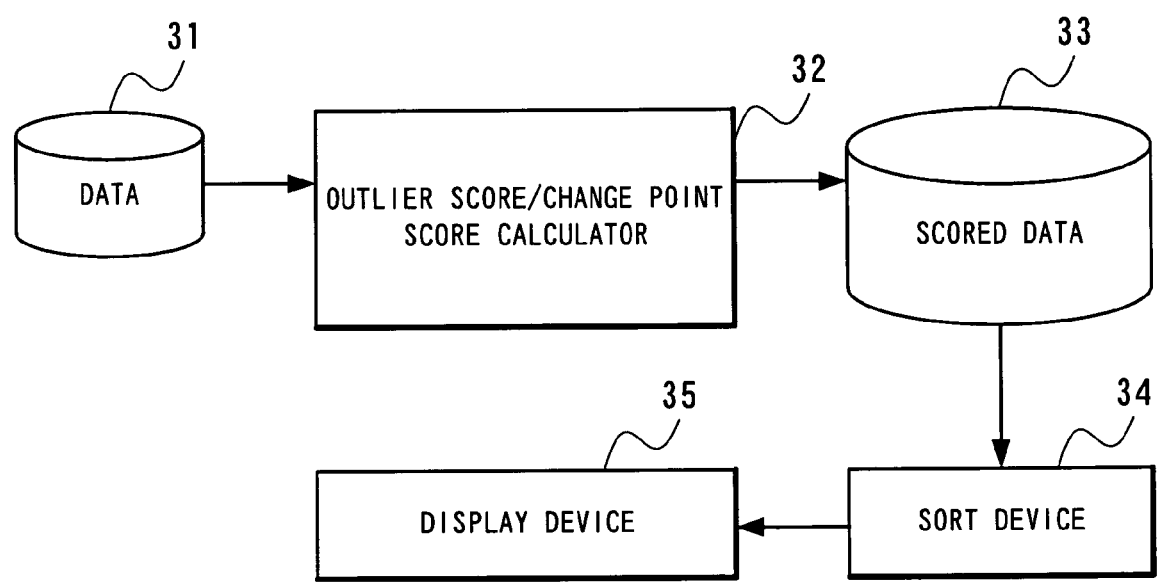
FIG. 6 is a configuration diagram to show the configuration of a fourth embodiment of the device to determine outlier and change point candidates according to the present invention.

Then, referring to FIG. 6, a fourth embodiment is described below.

This figure shows data 31, an outlier score/change point score calculator 32, which is the score calculator described above, a scored data 33, a sort device 34 and a display device 35. The data 31 is a database storing data series with a finite length. The outlier score/change point score calculator 32 is a device to calculate the outlier score and the change point score as described in the embodiment 2 or 3 above. The scored data 33 receives and stores the outputs from the outlier score/change point score calculator 32. The sort device 34 sorts the data in the descending order of score using the outlier score and the change point score.

Figure 7:
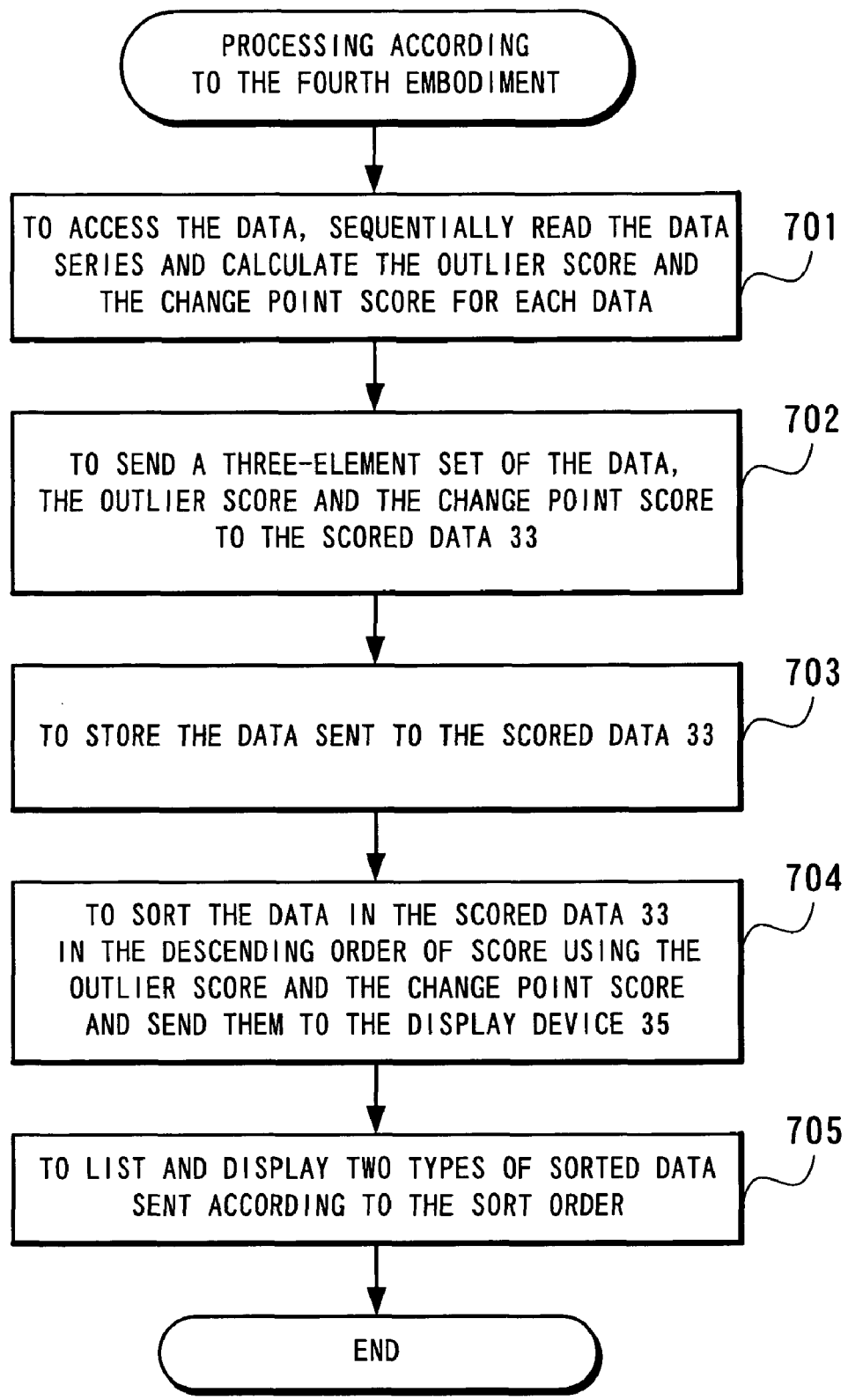
FIG. 7 is a flowchart to illustrate the operation of the fourth embodiment.

The devices shown in the figure work according to the order below. The operation of the fourth embodiment is described below with referring to the flowchart of FIG. 7.

The outlier score/change point score calculator 32 accesses the data 31, sequentially reads the data series and calculates the outlier score and the change point score for each data (Step 701) and then sends a three-element set of the data, the outlier score and the change point score to the scored data 33 (Step 702).

The scored data 33 stores the sent data (Step 703).

The sort device 34 accesses the database of the scored data 33 and sorts the data stored there in the descending order of score using the outlier score and the change point score and send them to the display device 35 (Step 704).

The display device 35 lists and displays two types of sorted data sent according to the sort order (Step 705).

Figure 8:
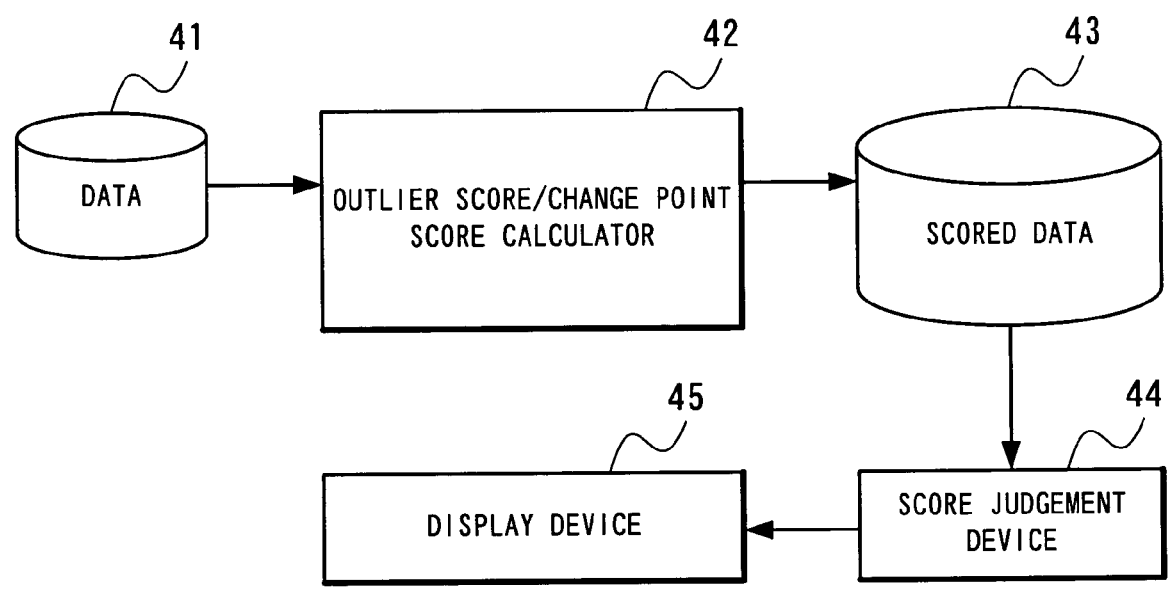
FIG. 8 is a configuration diagram to show the configuration of a fifth embodiment of the device to determine outlier and change point candidates according to the present invention different from FIG. 3.

Next, referring to FIG. 8, a fifth embodiment is described.

The figure shows data 41, an outlier score/change point score calculator 42, which is the score calculator as described above, scored data 43, a score judgement device 44 and a display device 45. The score judgement device 44 is provided in FIG. 4 instead of the sort device 34 in FIG. 3.

The data 41 is a database storing data series with a finite length. The outlier score/change point score calculator 42 is a device to calculate the outlier score and the change point score as described in the embodiments 2 or 3 above. The scored data 43 receives and stores the outputs from the outlier score/change point score calculator 42. The score judgement device 44 accesses the database of the scored data 43 and sends the data over the predetermined threshold selected from the stored data using the outlier score and the change point score to the display device 45.

Figure 9:
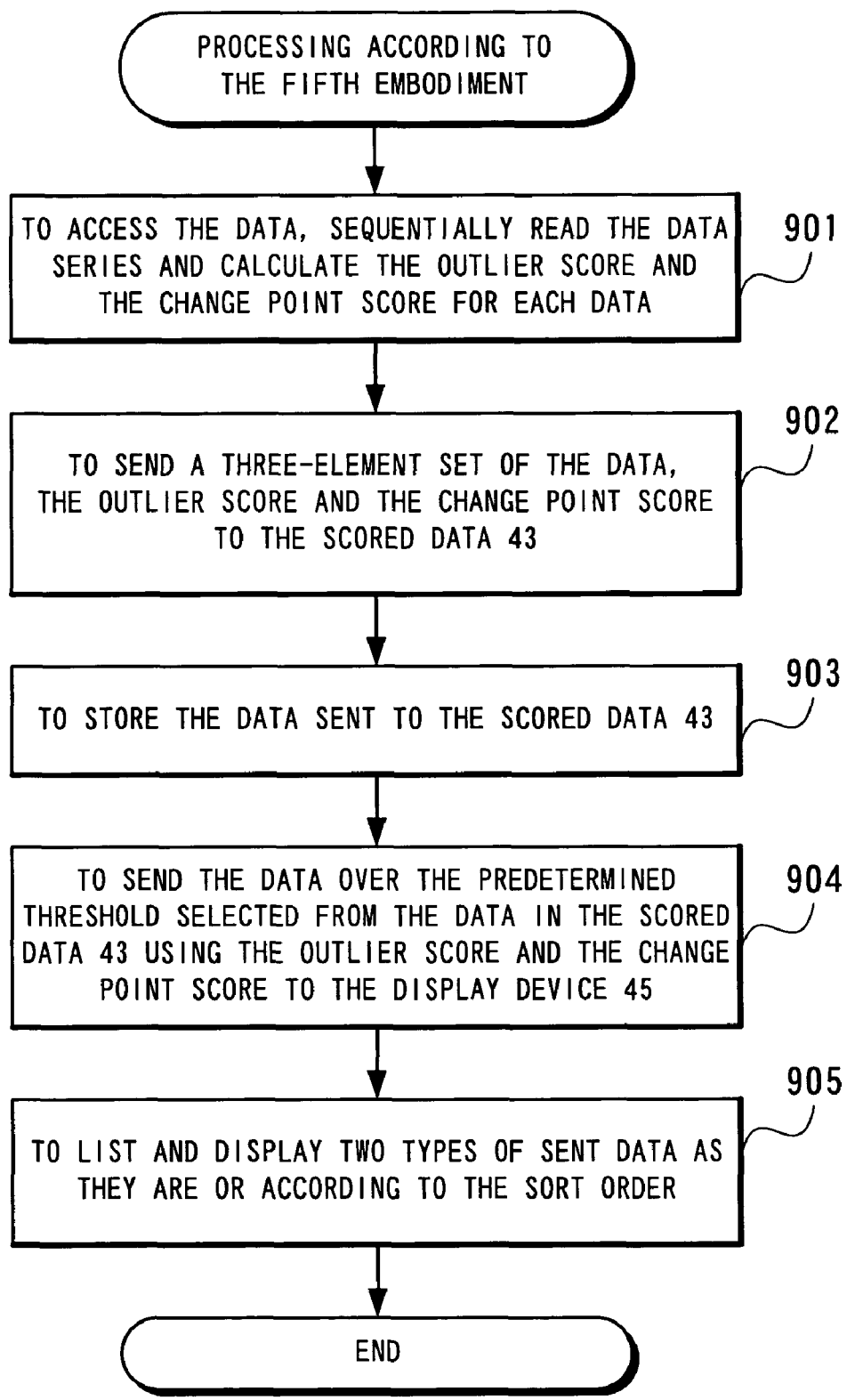
FIG. 9 is a flowchart to illustrate the operation of the fifth embodiment.

The devices shown in the figure work according to the following order. The operation of a fifth embodiment is described below with referring to the flowchart of FIG. 9.

The outlier score/change point score calculator 42 accesses the database of the data 41 and, with reading the data series sequentially, calculates the outlier score and the change point score for each data (Step 901).

To the database of the scored data 43, a three-element set consisting of the data, the outlier score and the change point score is sent sequentially (Step 902).

The database of the block 43 stores the sent data (Step 903).

The score judgement device 44 accesses the database of the scored data 43 and sends the data over the predetermined threshold selected from the stored data using the outlier score and the change point score to the display device 45 (Step 904).

The display device 45 displays the two types of sent data as they are or lists them according to the sort order (Step 905).

Figure 10:
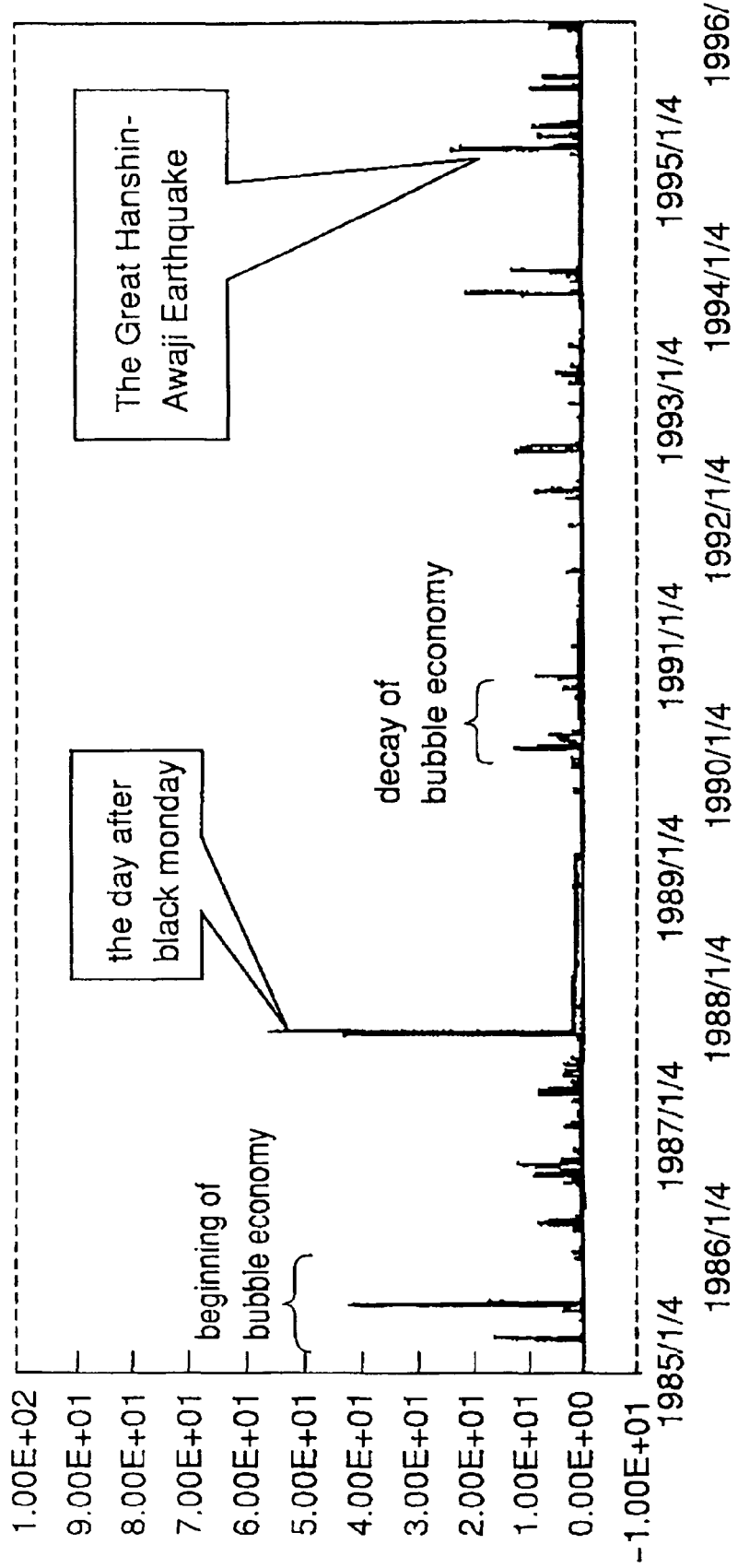
FIG. 10 is a graph to show an embodiment of experiment results on the change points using the score calculator shown in FIG. 2.

Next, referring to FIG. 10, the actual data analyzed using the score calculator for the outlier score and the change point score described with referring to FIG. 2 are described.

This experiment was conducted in order to find out the change point. This is an example in which the daily data of Tokyo Stock Price Index (TOPIX) (1946-1998) are analyzed and the results of the period from 1985 to 1995 are shown. The graph shows the original data and the change point score attached to them. The data are pre-processed. In other words, if the original series is "One-dimensional" and is "$x_t$", this is converted to "$x_t, x_t-x_{t-1}$". It is expected that such conversion helps detection of sharp change of the trend in addition to change of the average. According to this analysis result, it is understood that the change point score is high for so-called Black Monday and in the period of generation and collapse of the bubble economy. The graph shows a quite high peak on the day following the Black Monday.

Though the above explanation refers to the functional blocks shown in the figures, the functions can be freely distributed by separation or unification as far as the above functions are satisfied. The above explanation does not limit the present invention.

As described above, the present invention has an effect that the extent of statistical outlier or change point appearing in the time-series data is measured and presented as the outlier score or the change point score and that their detection is enabled with a high accuracy.

The reasons are as follows:

First of all, the time-series model learning device that learns the generation mechanism of the read data series as the time-series statistic model is used for the data string input sequentially.

In addition, the score calculator calculates the outlier score of each data based on the time-series model parameter and the input data.

Further, the outlier and the change point are detected through calculation of the outlier score and the change point score by combining the moving average calculator to calculate the moving average of the outlier scores, the time-series model learning device to learn the mechanism for generation of moving average series as the time-series statistical model and a score calculator that further calculates the outlier score of the moving average based on the moving average of the outlier scores and outputs the result as the change point score of the original data.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. An outlier and change point detection device, comprising:
   a first time-series model learning device for learning a probability distribution of sequentially input data as a time-series statistic model specified by a finite number of parameters;
   an outlier score calculator for reading the parameters obtained through learning by said first time-series model learning device, and for calculating an outlier score of the data based on the read parameters of the time-series statistic model and the input data, and for outputting the outlier score;
   a moving average calculator for sequentially reading each outlier score calculated by said outlier score calculator, and for calculating a moving average of the read outlier scores;
   a second time-series model learning device for sequentially reading each moving average of the read outlier scores calculated by said moving average calculator, and for learning a particular probability distribution for the read moving averages as a particular time-series statistic model specified by a finite number of particular parameters; and
   a change point score calculator for reading the particular parameters obtained through learning by said second time-series model learning device, and for calculating a particular outlier score for each moving average calculated by the moving average calculator based on the read particular parameters of the particular time-series model and the moving average calculated by the moving average calculator, and for outputting the particular outlier score for each moving average as a change point score of the data.

2. The outlier and change point detection device of claim 1,
   wherein said first time-series model learning device is configured to learn, in a case where the sequentially input data are described with continuous variate only, the probability distribution for generation of said data while sequentially reading real number vector values of the data and by using an autoregressive model; and
   wherein the first time-series model learning device further comprises:
      a data updating device for updating a particular statistic of the autoregressive model by forgetting at least a portion of past data that has been read and using newly read data of said data; and
      a parameter calculator for reading the particular statistic updated by said data updating device, and for calculating a specific parameter of the autoregressive model using the particular statistic.

3. The outlier and change point detection device of claim 1,
   wherein said outlier score calculator and said change point score calculator are considered as a single score calculator; and
   wherein the outlier and change point detection device further comprises:
      a sort device for sorting the data in descending order based on the outlier scores and the change point scores calculated by said score calculator; and
      a display device for displaying a particular number of data pieces of said data with high scores according to the order sorted by said sort device as candidates for being outliers and change points of the data.

4. The outlier and change point detection device of claim 1,
   wherein said outlier score calculator and said change point score calculator are considered as a single score calculator; and
   wherein the outlier and change point detection device further comprises:
      a score judgement device for outputting data pieces of the data that are over a predetermined threshold from the outlier score and the change point score calculated by said score calculator as the candidates of outliers or change points.

5. An outlier and change point detection method used for machine learning or data mining to detect candidate outliers and change points in a data series by calculating outlier scores and change point scores for a plurality of data pieces of the data series, said method comprising:
   sequentially reading each data piece of the plurality of data pieces of the data series, and, for each data piece of the plurality of data pieces, performing processing when the data piece is read, said processing comprising:
      learning at least one corresponding parameter of a corresponding probability distribution of a corresponding time-series statistic model related to the data piece based on one or more first data pieces that have already been read among the plurality of data pieces;
      calculating a corresponding outlier score of the data piece based on the at least one corresponding parameter and one or more second data pieces that have already been read among the plurality of data pieces;
      calculating, for the data piece, a corresponding moving average based on one or more previously calculated outlier scores for one or more third data pieces that have already been read among the plurality of data pieces;
      learning at least one corresponding particular parameter of a corresponding particular probability distribution of a corresponding particular time-series statistic model related to the corresponding moving average based on one or more previously calculated moving averages for one or more fourth data pieces that have already been read among the plurality of data pieces;
      calculating a corresponding outlier score of the corresponding moving average associated with the data piece based on the at least one corresponding particular parameter and one or more previously calculated moving averages for one or more fifth data pieces that have already been read among the plurality of data pieces; and
      outputting the corresponding outlier score of the corresponding moving average associated with the data piece as the change point score of the data piece.

6. The outlier and change point detection method of claim 5,
   wherein, in case the sequentially read plurality of data pieces are described with a continuous variate only, said step of learning said at least one corresponding parameter comprises:
      learning the at least one corresponding parameter of the corresponding probability distribution using an autoregressive model;
      updating a particular statistic of the autoregressive model using the newly read data piece while forgetting one or more past data pieces that were read before said data piece among said plurality of data pieces; and calculating the at least one corresponding parameter of the corresponding probability distribution of the autoregressive model using the particular statistic.

7. The outlier and change point detection method of claim 5, further comprising:

sorting the plurality of data pieces in a descending order based on the corresponding outlier scores and the corresponding change point scores; and displaying a predetermined number of the plurality of data pieces that are at a top of the sorted order of the plurality of data pieces as outlier and change point candidates of the data series.

8. The outlier and change point detection method of claim 5, further comprising:

selecting particular data pieces of the plurality of data pieces that have corresponding outlier scores and corresponding change point scores over predetermined thresholds as the candidate outliers or change points for the data series.

9. A device for inputting a plurality of data pieces of a data series and for calculating outlier scores and change point scores for the plurality of data pieces to be used for performing data mining with respect to the data series, said device comprising:

a first time-series model learning device for sequentially inputting each data piece of the plurality of data pieces, and for learning, for each data piece of the plurality of data pieces when the data piece is input, a corresponding parameter of a probability density function related to the data piece based on one or more data pieces of the plurality of data pieces that have already been input to the first time-series model learning device;

an outlier score calculator for inputting, for each data piece of the plurality of data pieces, the data piece and the corresponding parameter learned by the first time-series model learning device, and for calculating, for each data piece of the plurality of data pieces, a corresponding outlier score based on the corresponding parameter and one or more data pieces of the plurality of data pieces that have already been input to the outlier score calculator;

a moving average calculator for sequentially inputting the corresponding outlier score calculated by the outlier score calculator for each data piece of the plurality of data pieces, and for calculating, for each data piece of the plurality of data pieces, a corresponding moving average based on one or more of the outlier scores from the outlier score calculator that have already been input to the moving average calculator;

a second time-series model learning device for sequentially inputting the corresponding moving average calculated by the moving average calculator for each data piece of the plurality of data pieces, and for learning, for each data piece of the plurality of data pieces when the corresponding moving average is input, a corresponding particular parameter of a particular probability density function related to the corresponding moving average based on one or more moving averages from the moving average calculator that have already been input to the second time-series model learning device; and a change point score calculator for inputting, for each data piece of the plurality of data pieces, the corresponding moving average calculated by the moving average calculator and the corresponding particular parameter learned by the second time-series model learning device, and for calculating, for each data piece of the plurality of data pieces, a corresponding change point score based on the corresponding particular parameter and one or more moving averages from the moving average calculator that have already been input to the change point score calculator.

10. The outlier and change point detection device of claim 1, further comprising:

a score judgement device for determining one or more change points of the input data based on the change point scores output from the change point score calculator; and a display device for displaying the one or more change points.

11. The outlier and change point detection device of claim 1, further comprising:

a storage device for storing one or more change point scores output from the change point score calculator.

12. The outlier and change point detection method of claim 5, further comprising:

storing, for each data piece of the plurality of data pieces, the corresponding outlier score of the data piece.

13. The outlier and change point detection method of claim 5, further comprising:

storing, for each data piece of the plurality of data pieces, the change point score of the data piece.

14. The outlier and change point detection method of claim 5, further comprising:

determining candidate change points of the plurality of data pieces based on the change point score for each data piece of the plurality of data pieces; and displaying the candidate change points of the plurality of data pieces.

15. The device of claim 9, further comprising:

a storage device for storing, for each data piece of the plurality of data pieces, the corresponding outlier score.

16. The device of claim 9, further comprising:

a storage device for storing, for each data piece of the plurality of data pieces, the corresponding change point score.

17. The device of claim 9, further comprising:

a score judgement device for determining one or more candidate change points of the plurality of data pieces based on the corresponding change point score for each data piece of the plurality of data pieces; and a display device for displaying the one or more candidate change points.

* * * * *